United States Patent [19]
Tauern

[11] 3,815,812
[45] June 11, 1974

[54] METHODS AND MEANS FOR COUNTING WELDING OPERATIONS

[76] Inventor: Dankmar Tauern, House Nr. 390, 9497 Triesenberg, Liechtenstein

[22] Filed: June 11, 1973

[21] Appl. No.: 368,484

[30] Foreign Application Priority Data
June 23, 1972 Germany.......................... 2230915

[52] U.S. Cl............. 235/92 PD, 219/109, 219/113, 235/92 R, 235/92 NT, 320/1, 340/248 W, 340/267 W
[51] Int. Cl. ....................... H03k 25/00, B23k 9/00
[58] Field of Search... 340/248 W, 267 W; 219/109, 219/113; 320/1; 235/92 NT, 92 PD, 92 EL

[56] References Cited
UNITED STATES PATENTS

| | | | |
|---|---|---|---|
| 2,027,224 | 1/1936 | David............................ | 235/92 NT |
| 2,147,918 | 2/1939 | Overbeck....................... | 235/92 EL |
| 3,155,810 | 11/1964 | Parrott............................. | 219/109 |
| 3,319,039 | 5/1967 | Glorioso ........................ | 219/113 X |
| 3,406,272 | 10/1968 | Ehrlich ............................. | 219/109 |
| 3,441,718 | 4/1969 | Hatherell et al................ | 235/92 PD |
| 3,611,103 | 10/1971 | Ayers..................................... | 320/1 |

Primary Examiner—David L. Trafton
Attorney, Agent, or Firm—Toren, McGeady and Stanger

[57] ABSTRACT

In the apparatus disclosed a welder produces welds by discharging a capacitor bank through a stud to be welded. Sensing means reactively coupled to the circuit produces signals corresponding to the changes in an electrical condition at the capacitor bank. Threshold means responsive to the sensing means produce an indication when the signal traverses a predetermined magnitude lower than that corresponding to a welding discharge of the capacitor but higher than signals expected from other changes to be expected in the electrical condition. A counter counts the number of indications. Preferably suitable diodes with sensing means suppress signals due to changes in charging currents in the capacitor bank.

29 Claims, 4 Drawing Figures

METHODS AND MEANS FOR COUNTING WELDING OPERATIONS

BACKGROUND OF THE INVENTION

This invention relates to capacitor-discharge stud welding apparatuses, and particularly to methods and means for counting the number of effective welding operations of such apparatuses.

In a capacitor-discharge stud welding apparatus, a capacitor battery which usually stores the welding energy, is charged from a current supply and discharged through a welding circuit that includes welding electrodes. In addition, for purposes of safety, it is customary to discharge the capacitor battery after the welding apparatus is disconnected. In some welding apparatuses, it is possible to change the amount of energy stored in the capacitor battery so as to adapt the welding energy to the particular welding condition, such as the stud or bolt diameter and the type and quality of the base material to which the bolt is to be welded. To do this, the welding capacitor battery is either recharged or partly discharged.

It should be noted herein that the term "capacitor-discharge stud welding apparatus" is used interchangeably with the term "capacitor-discharge bolt welding apparatus" and is intended to convey the same meaning.

For several reasons, it may be desirable to know the number of effective welding operations performed by a capacitor-discharge stud welding apparatus. That is to say, it is desirable to note the number of times in which a stud welding operation has actually been carried out. This makes it possible, for example, to service the apparatus after a certain number of welding operations. When a stud welding apparatus is leased, the number of effective stud welding operations performed may be used as a basis for invoicing. In piecework, the number of effective welding operations may serve as a basis for calculating the piecework rate.

In these cases, it is essential that the counter exhibit extreme reliability and count only effective welding operations. For example, if the counter is coupled to the initiating switch to start the welding operation, it may count idle movements. Such an idle movement may consist of actuating the switch when the welding gun is not applied to the workpiece. Such a movement produces no welding operation.

If the counting operation responds to the current flowing in the welding lines, the counter may be subject to undesirable counting steps unless special measures are taken to prevent such undesired counts. This is so because many operations of a stud welding apparatus create currents which must not be counted, because such currents are not indicative of effective welding operations. Examples of the type of currents which may produce undesired stepping of a counter are charging currents, recharging currents, partial discharge currents, and currents due to safety discharge of the apparatus after it is disconnected.

An object of the invention is to improve capacitor-discharge stud welding apparatuses.

Another object of the invention is to overcome these difficulties.

Another object of the invention is to provide methods and means for reliably counting only effective welding operations in a capacitor-discharge stud welding apparatus.

SUMMARY OF THE INVENTION

According to a feature of the invention, these objects are attained, in whole or in part, by establishing substantially complete discharge of the capacitor battery with a time constant of the order of the time constant of the welding operation as the counting criterion. Complete discharge of the capacitor battery within a time period of the order of magnitude of the time period of the welding operation represents a reliable indicator of an effective welding operation. This allows only the number of truly effective welding operations to be counted and other operations to be disregarded.

According to another feature of the invention, a counting circuit is coupled inductively or capacitively with the welding line, and a counter actuating element is arranged in the counting circuit for stepping the counter by one unit when a minimum current value or a minimum voltage value is exceeded in the circuit.

According to another feature of the invention, various electronic, electrical, electromechanical, or electromagnetic devices which respond only to minimum current values or minimum voltage values can be used as a counter actuating element. An example of such a counter actuating element is a relay having a defined minimum actuating current. According to an embodiment of the invention, a Zener diode serves as a counter actuating element. Such a Zener diode is, according to an embodiment of the invention, connected in series with the counter. According to another embodiment of the invention, a resistor is connected in parallel with the Zener diode.

According to a feature of the invention, the counter itself is composed of any commercial counter, such as an electromagnetically actuated mechanical counter, a ratchet-wheel-operated counter, or a pulse-controlled counter. The counter used depends upon the type of counter actuating mechanism.

By virtue of these features, no mechanically acting parts which are subject to wear or which must be serviced or which are generally relatively complicated, need be used. Rather, according to a feature of the invention, the entire arrangement is composed of electrical parts. For example, according to a feature of the invention, a capacitance or inductance couples a counter actuating element that responds current values exceeding the minimum to the discharge circuit so that only those electrical operations of the stud welding apparatus which represent effective welding operations are used for counting. According to a feature of the invention, an RC member forms a series circuit with the counter actuating element and the circuit is connected parallel to the welding capacitor bank to sense the condition of the welding capacitor bank. In such an arrangement only a capacitor and a resistor are required in addition to the counter and the actuating element. The counter arrangement therefore requires little bulk, only a few parts, and small expenditure.

According to another feature of the invention, a diode is arranged parallel to the counter actuating element. The diode is poled to short-circuit the elements during the time a charging current charges the capacitor of the RC member. (The term "RC member" is used herein to describe a circuit composed of a resistor and capacitor, preferably in series). The diode prevents the counter from responding to the charging current of the welding capacitor battery. Normally, the welding circuit is arranged to make sure that the charging current of the welding capacitor battery is much lower than the welding current. Thus, the charging system need not have large dimensions. However, it is possible that the welding and charging currents are such that reliable distinction between the charging current and the welding current cannot always be made with certainty. The diode avoids any problem in this regard According to another feature of the invention, a coil inductively coupled with the welding line is connected in series with the counter actuating element. This feature is similar to the feature using a coupling capacitor. However, here, the current rise or drop in the welding line is used as a counting criterion. Since the current rise constitutes a reliable indication of an effective welding operation, this feature is particularly useful.

According to an embodiment, the current generated in the counter circuit by the current drop in the welding line, which current drop produces a current in the direction opposite to that produced by the current rise, bypasses the counter actuating element through the diode, or it is blocked by a diode in the counting circuit.

The effect of a rapid charge of the capacitor battery upon the counting circuit can be avoided by providing a charging line, separate from the discharge line, for the capacitor battery. The discharge line is coupled to the coil while the charging line is located sufficiently far from the coupling coil to be decoupled therefrom.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
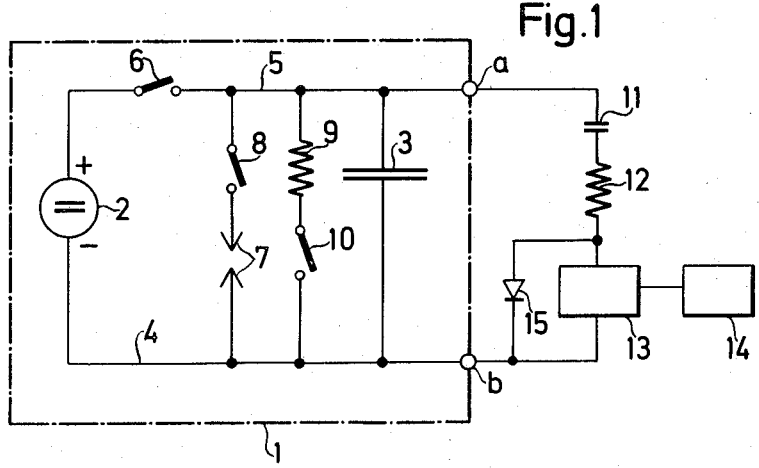
FIG. 1 is a schematic diagram illustrating a welding apparatus having a counting arrangement and embodying features of the invention.

In FIG. 1, a stud welding apparatus 1, indicated by a broken line, forms part of the stud welding system generally shown by the figure. In the stud welding apparatus 1, a direct current supply 2 establishes a DC voltage. A welding capacitor 3, having a capacitance of more than 10mF, is connected to the current supply 2 by two lines 4 and 5. A starting switch 6 controls the current through the line 5. A welding circuit includes welding electrodes 7 which are arranged between lines 4 and 5. A welding current switch 8 closes the welding circuit at the welding electrodes 7 to perform the welding operation.

A discharge resistor 9 and a discharge switch 10 in series with the resistor 9 forms a discharge circuit between the lines 4 and 5 parallel to the welding capacitor 3. The welding capacitor 3 is shown symbolically. It may be composed of a bank of capacitors.

A capacitor 11 having a capacitance of the order of several nF forms a counting arrangement with a resistor 12, a threshold value relay 13 that serves as a counter actuating element, and counter 14. The counting arrangement is connected parallel to the welding capacitor 3 at the terminals $a$ and $b$. A diode 15 parallel to the threshold value relay 13 also forms part of the counting arrangement. The diode 15 is poled so that its cathode is connected to the negatively charged plate of the welding capacitor. According to an embodiment of the invention, the counter 14 is in the form of a pulse controlled electronic counter.

In operation, we start from an operating state in which the switches 6, 8, and 10 are open and the welding capacitor is discharged. After closing the charging switch 6, the welding capacitor 3 is charged so that its top plate as shown in the drawing exhibits a positive potential. In a manner corresponding to the charging of the welding capacitor 3, this operation also charges the capacitor 11. The latter has a much lower capacitance than the welding capacitor 3, namely of the order of 1 : 1,000,000. The charging current for the capacitor 11 flowing through the counting circuit does not affect the threshold value relay 13, especially since the latter is short-circuited by the diode 15 parallel thereto.

The threshold value relay, or threshold relay, 13 responds only when it carries a current which is higher than a predetermined current. The predetermined current must, of course, be lower than the current which appears as a result of discharge of capacitor 11 during an effective welding operation. This current is, of course, affected by the resistor 12. According to an embodiment of the invention, the predetermined current at which the relay 13 responds is selected to be sufficiently high, while still remaining not higher than the discharge current of the capacitor 11 in an effective welding operation, so that the diode 15 can be omitted. This is possible because the charging current for the capacitor 11 is then much lower than the current at which the relay 13 responds. When the welding capacitor 3 is completely charged, a charging switch 6 is opened.

In order to adapt the welding energy to the existing conditions, namely the welding stud diameter, the type and quality of the material being welded, the finish of the material being welded, etc., it is often necessary to function with a welding energy lower than that which corresponds to the energy of the welding capacitor 3 charged to its full operating voltage. In order to reduce the welding energy stored in the welding capacitor 3, and thus to reduce the excess welding voltage, the discharge switch 10 is closed temporarily, so that a part of the energy stored in the welding capacitor 3 can be discharged through the discharge resistor 9 and the switch 10. The resistance value of the discharge resistor 9 is selected to allow only the type of discharge current which is substantially lower than the welding current, such as a discharge current 1/1000 of the welding current. This prevents the switch 10 from being excessively stressed by this process and still allow a specific reduction of energy in the welding capacitor.

Partial discharge of the welding capacitor 3 in the welding circuit produces simultaneous partial discharge of the capacitor 11. However, since the discharge process is relatively slow, the current flowing in the counting circuit is relatively low. For this reason, the threshold value relay 13 does not respond to the current despite the fact that the blocking effect of the diode 15 causes substantially all of this current to flow through the threshold value relay 13. When the partial discharge is completed, switch 10 is opened again.

The release switch 8 is closed to carry out the welding operation. This discharges the welding capacitor 3 through the welding circuit which is composed in part of the release or operating switch 8 and the electrode 7. A relatively high current, such as several KA, flows because of the low resistance of the welding circuit, and rapidly discharges the welding capacitor 3.

This current flow also discharges the capacitor 11 very rapidly, such as in less than 1/100 of a second. Thus, a relatively high current flows through the threshold value relay 13. Substantially all the discharge current of the capacitor 11 flows through the threshold value relay 13 because the diode 15 blocks potential current flow through the diode. Since the current through the relay 13 exceeds the response threshold of this relay, it produces a counting step in the counter 14. The capacitance of the capacitor 11 and the resistance of the resistor 12 have values which establish the current flowing through the threshold value relay 13 so that its intensity is above the response limit of the threshold value relay only when the voltage variation of the capacitor exceeds a variation which corresponds to the welding discharge, such as $dV/dt \cong 10^5$ volts/second.

By proper selection of the RC member formed by the capacitor 11 and the resistor 12, the counter counts only true effective welding operations.

Figure 2:
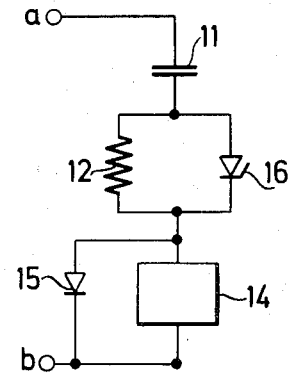
FIG. 2 is a schematic circuit diagram illustrating another embodiment of the counting arrangement having features of the invention.

The counting circuit of FIG. 2 can be connected to the terminals $a$ and $b$ of the stud welding apparatus 1 of FIG. 1. Here, as in all the figures, like reference characters designate like parts. The counting circuit of FIG. 2 is composed of a capacitor 11, a parallel circuit having a resistor 12 and a Zener diode 16, and another parallel connection composed of a counter 14 and a diode 15. The capacitor 11 and the two parallel circuits are connected in series across the terminals $a$ and $b$.

According to an embodiment of the invention, the diode 15 is omitted when conditions corresponding to those for omitting the diode 15 of FIG. 1 prevail.

Charging of the welding capacitor 3 produces a current which can flow unhindered through the diode 15 and the Zener diode 16 when poled as shown in FIG. 2. Both diodes are poled for blocking currents produced during the welding operation. However, Zener diode 16 breaks down in response to such welding currents when its breakdown voltage is attained. The Zener voltage of the Zener diode 16 is sufficiently high to break down only when the welding capacitor 3 is discharged abruptly. This occurs during an effective welding operation when practically the entire voltage of the capacitor 11 is applied instantaneously aross the parallel connection of the Zener diode 16 and the resistor 12. This causes the counter to respond. The value of resistor 12 is selected so that the counter 14 does not respond before the Zener diode 16 breaks down. The Zener diode 16, which constitutes a thrreshold device, forms the counter actuating element for the counter 14. The operation of the circuit of FIG.2 otherwise corresponds to the operation of the circuit in the system of FIG. 1.

Figure 3:
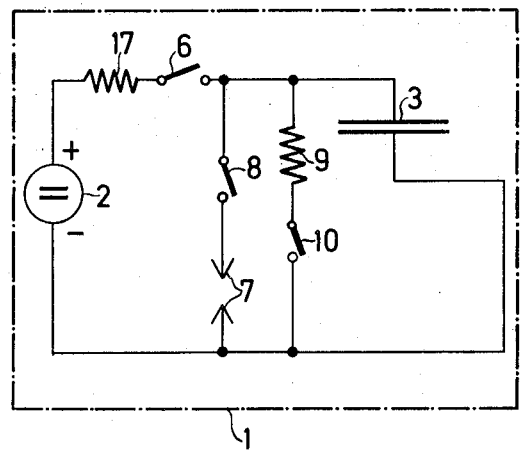
FIG. 3 is a schematic circuit diagram of another system having a counting arrangement and embodying features of the invention.
Figure 3:
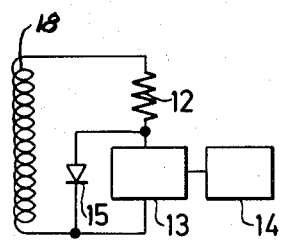

The system of FIG. 3 corresponds to the system of FIG. 1. However, here, a charging resistor 17 limits the charging current in the charging circuit of the welding capacitor 3 in order to keep the charging current much lower than the welding current. In contrast to the embodiment of FIGS. 1 and 2, the counting circuit is formed by a coil 18 coupled inductively with the welding line, and a resistor 12 in the threshold value relay 13. The coil 18 and the resistor 12 as well as the relay 13 form a series circuit. The counter 14 is again connected to and controlled by the threshold value relay 13. The diode 15 across the relay 13 is poled to cause current by bypass the relay 13 during charging of the welding capacitor 3.

According to an embodiment of the invention, the relay 13 is sufficiently slow to recognize the double pulse induced in coil 18 by variation of the current in the welding line as a single pulse. Diode 15 is then omitted.

The operation of the system of FIG. 3 corresponds to that of FIG. 1. When the welding capacitor 3 is charged after switch 6 is closed, the charging resistor 17 limits the charging current to a value that is sufficiently low so that the current that flows in the counting circuit coupled by means of coil 18 is below the response threshold of the threshold value relay 13.

Partial discharge of the welding capacitor through the discharge resistor 9 and the discharge switch 10 also causes the current flowing in the counting circuit to be below the response threshold of the threshold value relay 13.

Partial discharge of the welding capacitor through the discharge resistor 9 and the discharge switch 10 also causes the current flowing in the counting circuit to be below the response threshold of the threshold value relay 13. Only when the welding operation is initiated by closing the switch 8 does the high welding current flowing in the welding line induce a sufficiently high current in the coil 18 to make the threshold value relay 13 respond and step the counter 14.

Figure 4:
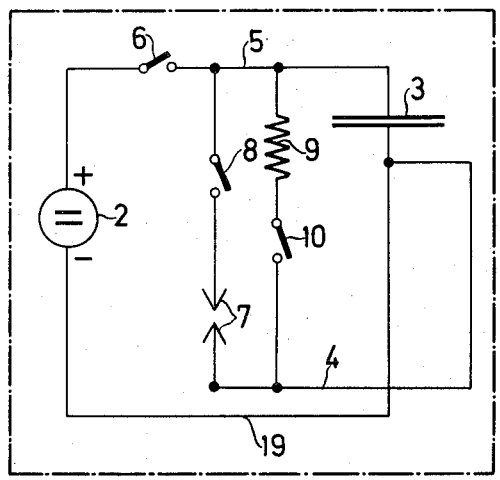
FIG. 4 is a schematic circuit diagram of another system having a counting arrangement embodying features of the invention.
Figure 4:
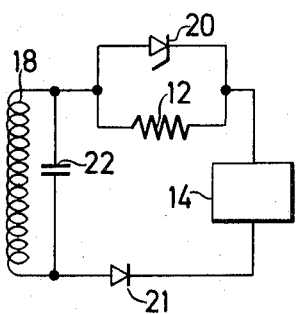

The system of FIG. 4 is similar to that of FIG. 3. It contrasts to FIG. 3 in that the charging resistor 17 is omitted in the stud welding apparatus of FIG. 4. A separate charging line branch 19 is located to be geometrically far enough from the coil 18 so that the latter is substantially uncoupled from the charging current. Consequently, only the line branch of the welding circuit induces a current in the coupling coil 18. This induced current corresponds to the current flowing in the branch line and depends upon its rise time.

According to another embodiment of the invention, the counting circuit of FIG. 3 is connected to the stud welding apparatus 1 of FIG. 4 in place of the counting circuit of FIG. 4.

In the counting circuit of FIG. 4, a series circuit composed of a diode 21, the counter 14, and a shunt circuit composed of Zener diode 20 and the resistor 12 is connected across the coil 18. The Zener diode 20 and the diode 21 are poled oppositely so that when the voltage induced by the welding current rises in coil 18, the Zener diode 20 breaks down. A capacitor 22 across the coil 18 serves as an intermediate storage.

The circuit is adapted to the response characteristics of the counter 14 by selecting the number of turns of the coil 18 and the value of resistance 12, as well as the breakdown voltage of Zener diode 20. As in the circuit of FIG. 2, the Zener diode 20 of FIG. 4 serves as a counter actuating member. The operation of the Zener diode 20 is similar to the Zener diode of FIG. 2.

While specific embodiments of the invention have been shown and described in detail to illustrate the application of the inventive principles, it will be understood that the invention may be embodied otherwise without departing from such principles.

What is claimed is:

1. The method of counting the number of welding operations performed by a welder which produces welding by discharging a capacitor through a line to a stud to be welded, comprising sensing the changes in an electrical condition in one of the line and capacitor and producing signals corresponding to the changes, producing an indication when the signal exceeds a predetermined magnitude lower than that corresponding to welding discharge of the capacitor but higher than other changes expected from discharge in the electrical condition, and counting the number of indications.

2. An apparatus for counting the number of welds performed by a welder which produces welding by discharging a capacitor through a line to a member to be welded, comprising sensing means coupled to the line for sensing changes in an electrical condition of one of the line and capacitor and for producing signals corresponding to the changer, threshold means responsive to said sensing means for producing an indication when the signals traverse a predetermined magnitude lower than that corresponding to welding discharge of the capacitor but higher than other changes expected from discharge in the electrical condition, and counting means for counting the number of indications.

3. An apparatus as in claim 2, wherein said sensing means are coupled to the line inductively and said threshold means produce an indication when the signal exceeds the predetermined value.

4. An apparatus as in claim 2, wherein said sensing means is coupled to the line capacitively, and wherein said threshold means produces an indication when the signal exceeds the predetermined value.

5. An apparatus as in claim 4, wherein said sensing means includes an RC circuit, said sensing means connecting said RC circuit and said threshold means in series with each other and across the capacitor.

6. An apparatus as in claim 3, wherein said sensing means includes a coil inductively coupled with the lines, said threshold means being series-connected with said coil.

7. An apparatus as in claim 6, wherein said sensing means includes a capacitor connected parallel to said coil.

8. An apparatus as in claim 6, wherein said sensing means includes a separate charging line for the capacitor decoupled from said coil.

9. An apparatus as in claim 2, wherein said sensing means includes a diode shunting said threshold means, said diode being poled to pass current corresponding to the charging current through the capacitor so that charging currents leave said threshold means substantially unaffected.

10. An apparatus as in claim 6, wherein said sensing means includes a diode shunting said threshold means, said diode being poled to pass current corresponding to the charging current through the capacitor so that charging currents leave said threshold means substantially unaffected.

11. An apparatus as in claim 5, wherein said sensing means includes a diode shunting said threshold means, said diode being poled to pass current corresponding to the charging current through the capacitor so that charging currents leave said threshold means substantially unaffected.

12. An apparatus as in claim 2, wherein said threshold means includes a Zener diode whose breakdown voltage forms the signals.

13. An apparatus as in claim 5, wherein said threshold means includes a Zener diode whose breakdwon voltage forms the signals.

14. An apparatus as in claim 6, wherein said threshold means includes a Zener diode whose breakdown voltage forms the signals.

15. An apparatus as in claim 9, wherein said threshold means includes a Zener diode whose breakdwon voltage forms the signals.

16. A stud-welding apparatus, comprising a capacitor bank, circuit means for charging said capacitor bank, electrode means for being coupled to an element to be welded, said circuit means coupling said capacitor bank to said electrode means so that said electrode means discharges said capacitor bank when a welding operation takes place, sensing means coupled to said circuit means for producing signals corresponding to changes of an electrical condition of said circuit means, threshold means responsive to said sensing means for producing an indication when the signal traverses a predetermined magnitude lower than that of a signal corresponding to the discharge experienced by the capacitor bank during a welding operation, but higher than the signal expected from other changes in the electrical conditions, and counting means for counting the number of indications.

17. An apparatus as in claim 16, wherein said sensing means includes first means coupled to said threshold means and capacitor means coupling said first means to said circuit means.

18. An apparatus as in claim 16, wherein said sensing means includes first means coupled to said threshold means and inductor means coupling said first means to said circuit means.

19. An apparatus as in claim 16, wherein said sensing means includes a capacitor and a resistor connected in series with said threshold means.

20. An apparatus as in claim 16, wherein said sensing means includes a capacitor connected in series with said threshold means and a resistor connected in parallel with said threshold means.

21. An apparatus as in claim 19, wherein said sensing means includes a diode shunting said relay means for passing current arising from signals corresponding to charging current of the capacitor bank around said threshold means.

22. An apparatus as in claim 20, wherein said sensing means includes a diode shunting said relay means for passing signals corresponding to charging current of the capacitor bank around said threshold means.

23. An apparatus as in claim 16, wherein said sensing means includes a capacitor and a resistor in series with said threshold means and a diode parallel with said threshold means, said threshold means including a relay.

24. An apparatus as in claim 16, wherein said sensing means includes a capacitor in series with said threshold means and a resistor in parallel with said threshold means, said threshold means including a Zener diode, a diode shunting said counter means and poled to pass charging current of said capacitor about said counting means.

25. An apparatus as in claim 16, wherein said sensing means includes an inductor inductively coupled with said circuit means, a resistor in series with said threshold means, a diode shunting said threshold means shunting signals corresponding to the charging current of said capacitor bank about said threshold means, said threshold means including a relay.

26. An apparatus as in claim 16, wherein said sensing means includes an inductor coupled to said circuit means, a resistor shunting said threshold means, a capacitor shunting said inductor, and a diode poled to pass only signals corresponding to discharge current from said capacitor bank, said diode being in series with said counter means and said threshold means, said threshold means including a Zener diode.

27. An apparatus as in claim 25, wherein said circuit means includes a line passing to said capacitor bank, said inductor being coupled to said line.

28. An apparatus as in claim 26, wherein said circuit means includes a first line forming a charging path for said capacitor bank and a second line forming a discharge line for said capacitor bank, said inductor being coupled to said discharge line and substantially decoupled from said charge line.

29. An apparatus as in claim 16, wherein the threshold means respond to signals corresponding to a discharge rate of a capacitor bank greater than $10^5$ volts/sec.

* * * * *

UNITED STATES PATENT OFFICE
CERTIFICATE OF CORRECTION

Patent No. 3,815,812     Dated June 11, 1974

Inventor(s) Dankmar Tauern

It is certified that error appears in the above-identified patent and that said Letters Patent are hereby corrected as shown below:

In the Heading of the Patent, Insert:

--[73] Assignee: Hilti Aktiengesellschaft
                                    Fuerstentum Liechtenstein.--

Signed and sealed this 1st day of October 1974.

(SEAL)
Attest:

McCOY M. GIBSON JR.                   C. MARSHALL DANN
Attesting Officer                        Commissioner of Patents